Dec. 1, 1925.  1,563,482

J. GOOD

CARBURETOR

Original Filed Dec. 2, 1916   5 Sheets-Sheet 2

Inventor
John Good
By Attorney

Dec. 1, 1925.  1,563,482
J. GOOD
CARBURETOR
Original Filed Dec. 2, 1916   5 Sheets-Sheet 4

Inventor
John Good
By Attorney

Patented Dec. 1, 1925.

1,563,482

UNITED STATES PATENT OFFICE.

JOHN GOOD, OF GARDEN CITY, NEW YORK, ASSIGNOR TO GOOD INVENTIONS CO., OF BROOKLYN, NEW YORK, A CORPORATION OF NEW YORK.

CARBURETOR.

Application filed December 2, 1916, Serial No. 134,784. Renewed September 28, 1923.

*To all whom it may concern:*

Be it known that I, JOHN GOOD, a citizen of the United States, residing in Garden City, Long Island, N. Y., have invented the following described Improvements in Carburetors.

This invention concerns the operation of combustion engines on kerosene or like non-volatile fuels and consists in the special relation of the exhaust heated liquid vaporizing agencies with respect to the rest of the charge forming apparatus as hereinafter explained, whereby such an engine can be operated through wide ranges of speed and load without disturbance of the proportions of the mixture entering the engine and hence with entire cleanliness of combustion.

In the accompanying drawings forming part hereof.

Figures 1, 2:
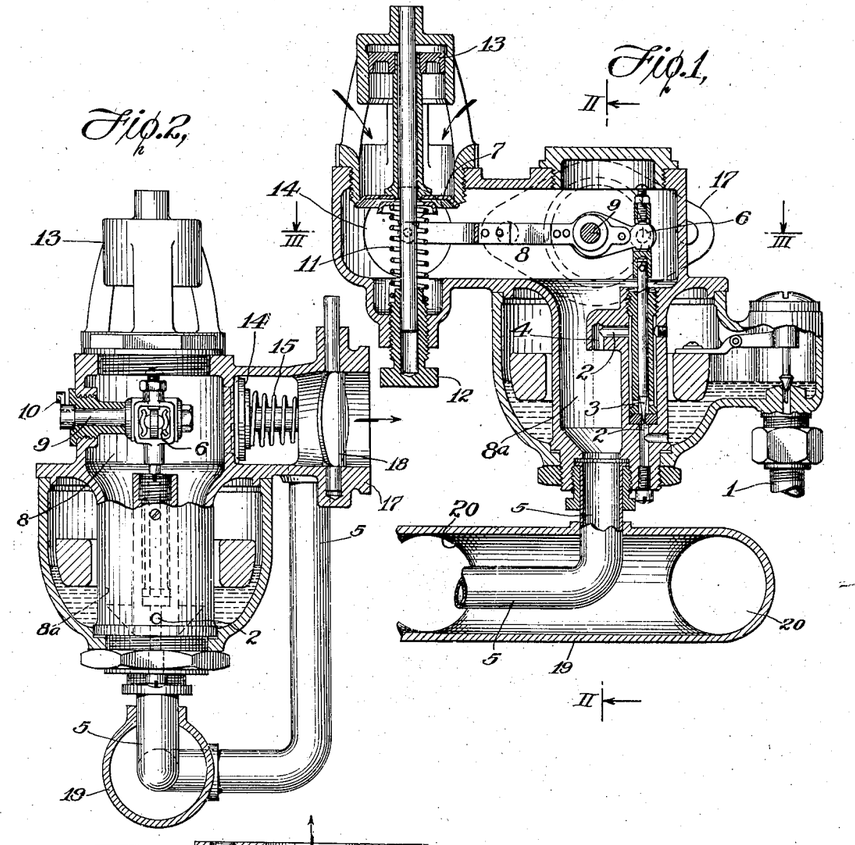
Fig. 1 is a vertical section of one form of the present invention.
Fig. 2 a section thereof on line II—II in Fig. 1.
Figure 3:
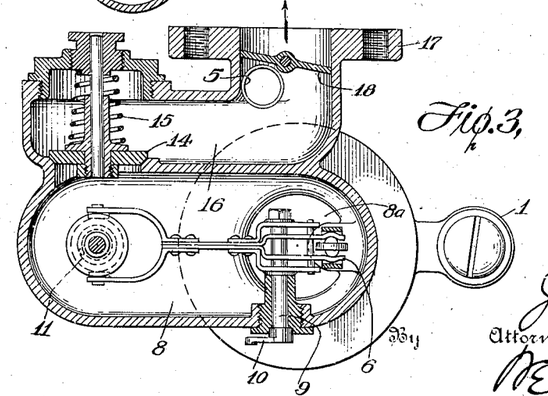
Fig. 3 is a horizontal section on line III—III of Fig. 1.

Referring first to the form of Figs. 1 to 3, the fuel liquid supply receiver, being shown as the conventional float chamber, is supplied with kerosene or like non-volatile fuel by the pipe 1. The liquid fuel is delivered from the float chamber through a duct 2, (Fig. 1) and the liquid flow through the latter is governed by a pin 3 coacting with a restricted part of the said duct. The liquid escaping past this device issues from the small nozzle orifice 4 into the entrance space 8ª of a vaporizing tube 5 which latter leads it to the intake manifold of the engine, as presently described. The pin 3 slides in a small bushing and its upper end is connected to the short arm of a lever 6, the other arm of which is connected to a member or body such as the valve 7 disposed in the path of the air inflowing to the apparatus. The lever 6 is fulcrumed in a chamber 8 which forms part of the communication between the outside atmosphere and the intake ports of the engine, and its fulcrumed axis is eccentric to the stud 9 on which it is carried, so that by rotating the said stud the location of said axis and thereby the relation of the pin in its restricted orifice can be adjusted with respect to the position assumed by the air valve 7. For this purpose the stud 9 is provided with an exterior adjustment arm 10 and the necessary setting and locking appliances therefor.

The air valve 7 is a single valve controlling the whole air supply, that is to say, all the air used for supplying the engine passes through the opening it controls, and opens it more or less according to the rate of flow of such air. The lever 6 and its modulating pin are correspondingly shifted, and constant proportions of the liquid fuel and air are thus automatically assured, it being understood that the pin 3 is specially tapered to accommodate the known flow characteristic of liquid emerging from carbureting nozzles, to the end stated. The air valve 7 is closed by a spring 11 which is adjustable by manipulation of its nut 12 and its motion is steadied by a dash-pot 13 on the end of its stem.

That portion of the inflowing air which does not flow to the engine by way of the chamber 8ª and the vaporizing tube 5 finds its passage thereto through a by-pass check valve 14 which is disposed, in the present case, in the lateral vertical wall of the chamber 8 and opens against an adjustable spring 15 into the passage 16 (Fig. 2). This passage terminates in a flange-fitting 17 adapted for connection to the intake header of the engine (not shown) and containing (in Figs. 1 to 3) the engine throttle 18, which in this case is located close to the point of attachment to the header. Such air as flows to the vaporizing tube 5 passes through the chamber 8 and its extension 8ª where it is joined by the liquid fuel delivered by the nozzle 4, and with such liquid it is led by the said tube through a heated region constituted by the exhaust gas passage of the engine. To this end, the tube 5 is housed for a considerable portion of its length inside of the exhaust header of the engine, and desirably directly in front of the exhaust ports 20 thereof (Fig. 1) whereby the mixture of air and liquid in the tube 5 are subjected to the exhaust gas temperature at its hottest point, the tube itself being subject to direct impingement by the flame from the ports. It will be understood that the several parts of the apparatus may be variously located with respect to each other according to the particular design of the engine on which it is used and that the manifold or header 19 is shown below the float chamber in Figs. 1 and 2 merely for convenience of illustration in the present case, and that the vaporizer tube 5 is formed with very thin walls. From the exhaust manifold the vaporizer tube 5 runs to the passage 16 above described just in advance of or outside of the throttle 18, so that the hot mixture of air and vaporized liquid fuel emerging from it will pass to the engine only as admitted by the adjustment of the throttle. In this passage 16 the hot mixture may meet and join such air as may be passing the spring closed check valve 14 and mix therewith to form the combustible charge mixture. There are thus in the present apparatus, two confluent passages 5 and 16 in parallel or multiple relation to each other and both conduct air to the engine, but only one conducts fuel and the latter passage is heated for the purpose of vaporizing the fuel and converting it into substantially dry gaseous state. Both passages converge in the present case on the outside or entering side of the throttle 18 and close to the intake manifold. The total air flow through both passages controls the liquid fuel delivery to one of them, and this is accomplished or may be accomplished either through the depression produced by the air admission means or by the lever control of the modulating device, or both. In the present case it will be noted the liquid delivery from the nozzle 4 is induced by the depression existing in the chamber space 8—8ª, which depression varies in proportion to the total amount of air flowing.

The by-pass valve 14 constitutes a flow resisting organ, the function of which is to insure at all times an adequate velocity through the vaporizer tube, sufficient to avoid the lingering of liquid kerosene therein when the engine is running slow or under partially closed throttle. Liquid kerosene, if allowed to remain in the vaporizer tube produces internal fouling not only of the tube but also of the interior of the engine. While the valve 14 thus serves to insure an adequate velocity through the vaporizer tube it serves at the same time the further purpose of preventing excessive velocity through the vaporizer tube under maximum engine speeds, which might be too rapid to permit adequate vaporization. The vaporizer tube 5 requires to be of cross sectional area predetermined with respect to the piston displacement of the engine and sufficient to carry in itself the combustion charge for a moderate or average load independently of the extra air through the other passage. Its length also requires to be predetermined to insure an adequate degree of vaporization of the liquid it carries at any load, and I have ascertained that with the vaporizer tube of about the proportions indicated, proper vaporization at all loads may be accomplished. Thereby the present invention enables kerosene and like fuel to be used for the propulsion of automobile engines, or engines which are called upon to operate at widely different load and speed conditions.

It should be stated that when the air check 14 opens, admitting relatively cool air into contact with the hot vaporized mixture from the vaporizer tube, some of the latter becomes thereby partly condensed and forms what may be strictly termed a fuel fog but by the manner of its contact with the cool air and its subsequent conduction, this fog is rendered utilizable without disturbing or impairing the cleanliness of the combustion and without incurring any of the other objections inherent upon the introduction of fuel in liquid form into the engine combustion space. Depending upon the setting of the spring of air valve 14 and the relative dimensions of the other parts, particularly the vaporizer tube, the present apparatus may be made to supply the engine with dry vaporized mixture of fuel and air up to a certain load or speed condition and thereafter, on the opening of said valve, to supply it with the described fog mixture, or the valve and parts can be so arranged that the by-pass check 14 will open at any load above idling, to thus supply fog mixture throughout practically the whole range.

Figure 4:
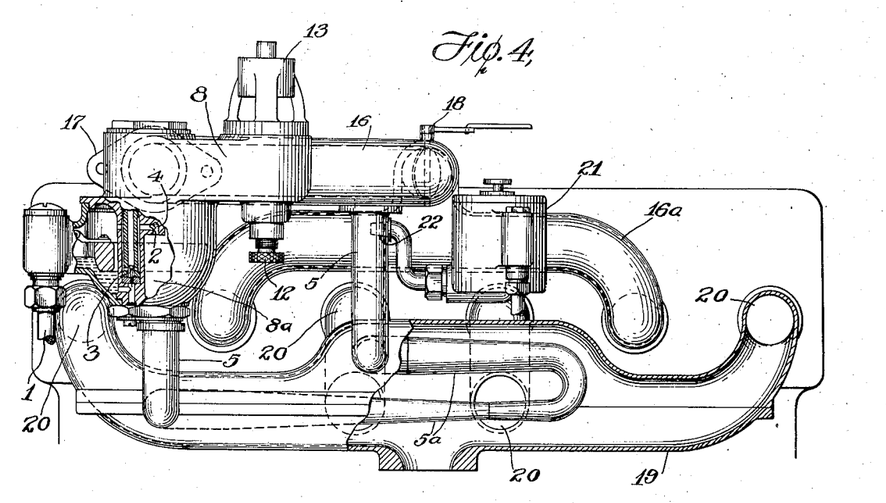
Fig. 4 is a composite side elevation and section of a modified form.
Figure 5:
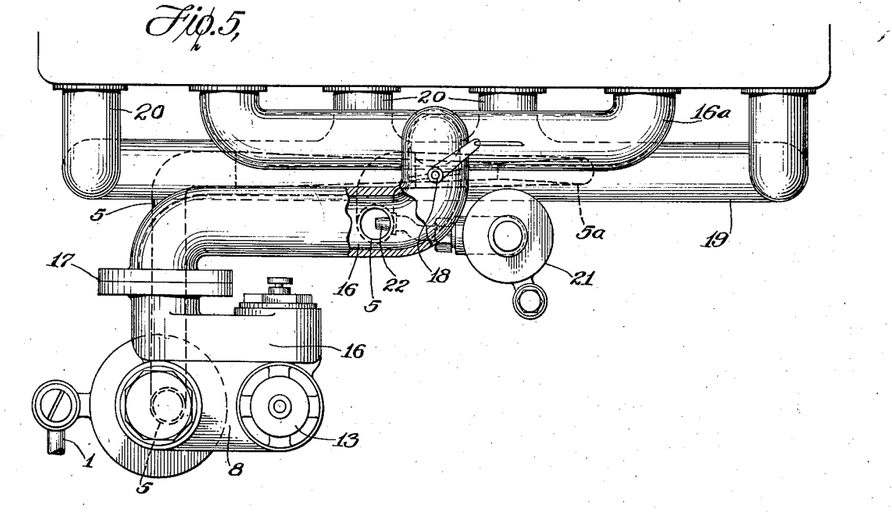
Fig. 5 a top plan partly in section thereof.

Referring now to Figs. 4 and 5, the principle of operation is the same as that described and the similar parts are identified with the same reference marks. The vaporizer tube 5, in this form however, is formed as a Venturi tube identified as 5ª and which is housed within the exhaust header 19, the said tube being formed with a long radius elbow in accommodation to the relative positions of the air passage 16 and the header. This form of the invention also illustrates the combination of the described principle of fuel supply with a water supply, that is to say with the addition of water to the charge mixture as a means of preventing excessive compression temperatures. The water supply is represented by a float chamber 21, similar to the fuel float chamber, and delivering the water to a nozzle 22, disposed in the outlet part of the vaporizing tube 5 and fairly close to the point where the vaporized mixture joins with the air flow in the passage 16. Delivery of water is caused by the pressure difference existing between the said passages 5 or 16 on the one hand and the pressure in the float chamber 21 on the other, and is understood to be regulated according to needs, either automatically or otherwise. In this form as in the form first described, the controlling throttle 18 is disposed at the entrance to the intake header 16$^a$, on the engine side of the point of confluence of the two passages 5 and 16, in which position it controls the flow as already explained without affecting the relations of the velocities in said passages.

Figure 6:
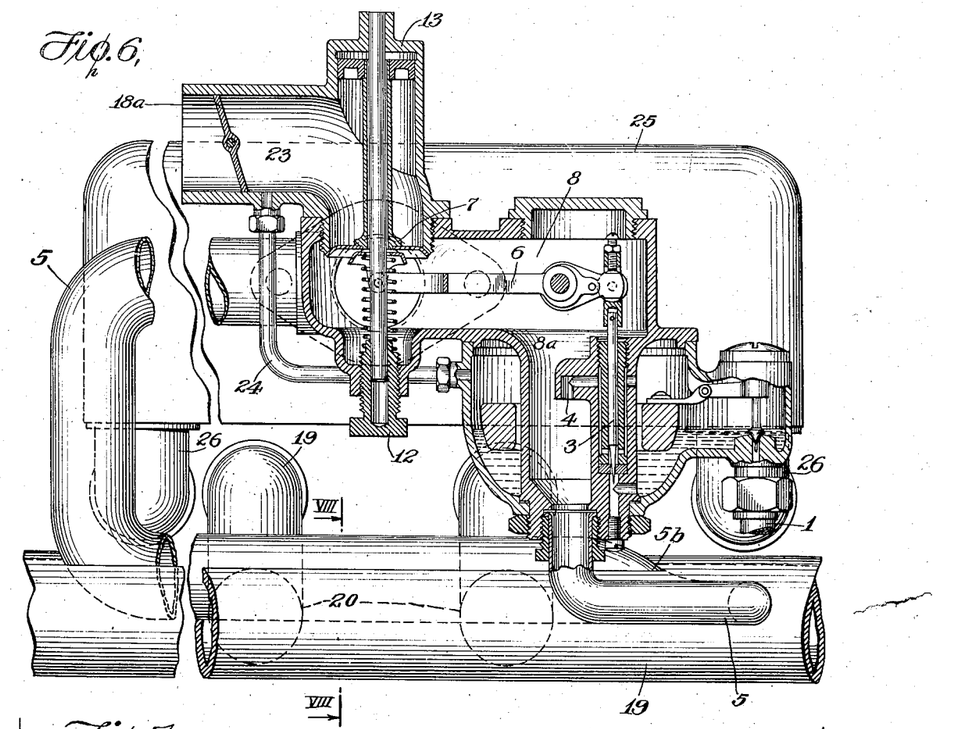
Fig. 6 a side elevation partly in section of a further modification.
Figures 7, 8:
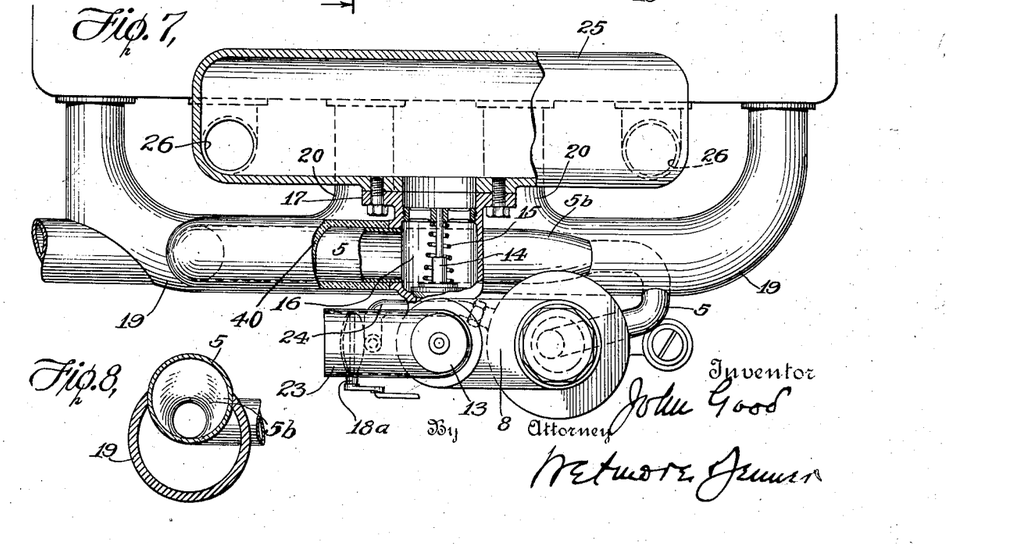
Fig. 7 a top plan partly in section thereof.
Fig. 8 being a section on line VIII—VIII of Fig. 6.

In Figs. 6 and 7 however, the throttle 18$^a$ is mounted in advance of the air valve 7 and controls the entire air flow thereto. The fuel delivery from the nozzle 4 in this form occurs by reason of the pressure difference between the liquid float chamber on the one hand and the pressure in the chamber space 8—8$^a$ on the other, it being noted that the float chamber and the space 23 on the inside of the throttle are connected by an equalizing pipe 24. In this form also, the vaporizer tube is expanded to a larger diameter at and beyond the point where the liquid therein is converted into the vaporous form, the purpose being to accommodate the larger volume resulting from such conversion. The point of enlargement is marked 5$^b$ in Figs. 6 and 7 and the upper part of said enlarged portion is arranged outside of the exhaust manifold 19 as shown in Fig. 8, so that the vapor rising to the upper part of the tube will not become overheated, while the lower part is within and surrounded by the exhaust gas to vaporize the liquid flowing along it. The exterior parts of said tube are however, covered with heat insulation 40, especially between the exhaust header and the intake header entrance as is shown clearly in Fig. 7. In this form of the apparatus the by-pass check valve 14 is assumed to be so adjusted in relation to the other parts and passages, as to open immediately on any increase of throttle opening above idling, so that the above described fog mixture is produced for all load conditions, dry fuel being delivered through the vaporizing tube, only when the engine is idling. To accommodate the fog mixture and conduct it to the engine in form suitable for cleanly combustion and engine maintenance, a large manifold pipe or intake header 25 is desired, such as a header being appropriately termed a box-form header, and the engine intake ports lead downwardly from the interior thereof, one being located at each end and marked 26 in Fig. 7.

The cubical capacity of the box-form suction intake is several times larger than a normal header such as used in ordinary gasoline engines (the latter being usually no wider than the intake ports of the engine) and its cross-sectional area is considerably greater than that of either of its intake ports 26. It will be understood that the vaporized mixture from the enlarged tube 5 joins the air which flows past the by-pass valve 14, and immediately in rear of said valve, in the space or passage marked 16. Such space or junction it will be noted is close to the intake header.

Figure 9:
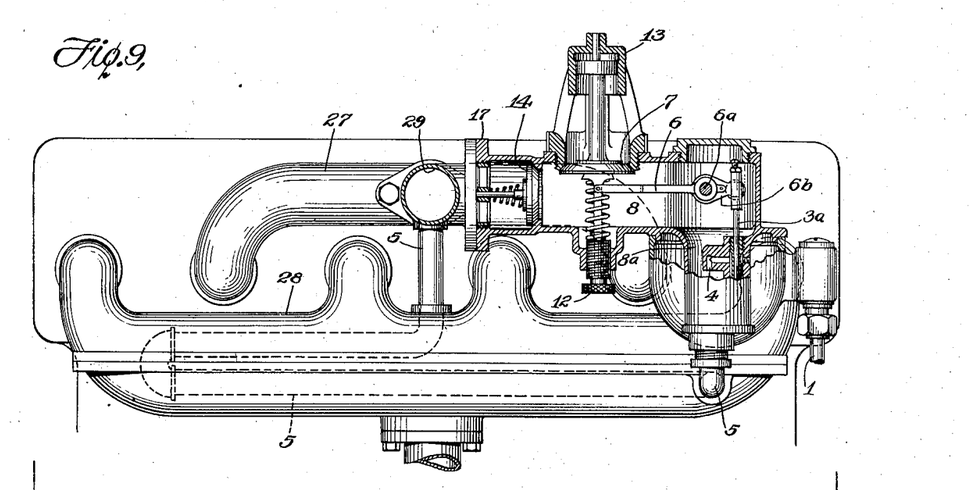
Figs. 9 and 10 represent in elevation and plan, partly in section, the application of the invention to a V-type engine.
Figure 10:
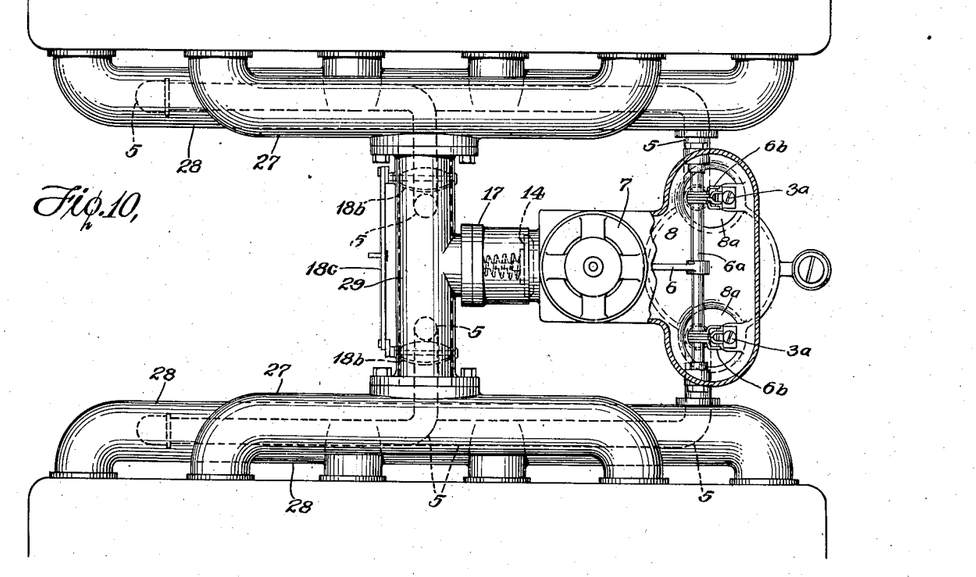

In the apparatus shown in Figs. 9 and 10, the parts marked 27 and 28 represent respectively, the suction intake and exhaust headers on the two proximate sides of a V-type eight cylinder engine. The suction headers 27 are joined by a cross pipe 29 which is supplied with air through the flange connection 17 of the proportioning apparatus already described, the latter being located between the two suction intakes and provided with an air valve 7, chamber 8 and lever 6 as already described. The lever 6 however, is constituted in part by a rock shaft 6$^a$ at its fulcrum axis and has two short arms 6$^b$ each one controlling a separate pin 3$^a$. The lever and both pins are contained in the chamber 8. One pin controls the liquid fuel delivered into a vaporizing tube 5 which runs through the exhaust header 8 on one side of the engine and into the cross-pipe 29 just in advance of, or outside of, the throttle 18$^b$, and the other pin controls the liquid delivered to a similar tube similarly disposed in the other exhaust header and similarly connected to the other part of the cross pipe 29 so that there are thus two devices each delivering to a separate vaporizer tube for each half or side of the engine although but a single air entrance controls both. A single float chamber also serves both devices. Otherwise the construction and mode of operation are the same as that already described. The two throttles 18$^b$ are understood to be joined together for simultaneous and equal operation by a single controlling instrument 18$^c$. These are to be regarded, however, as two single throttles, since in this case there are virtually two engines, each having its own vaporizing tube and fuel orifice.

Figures 11, 12:
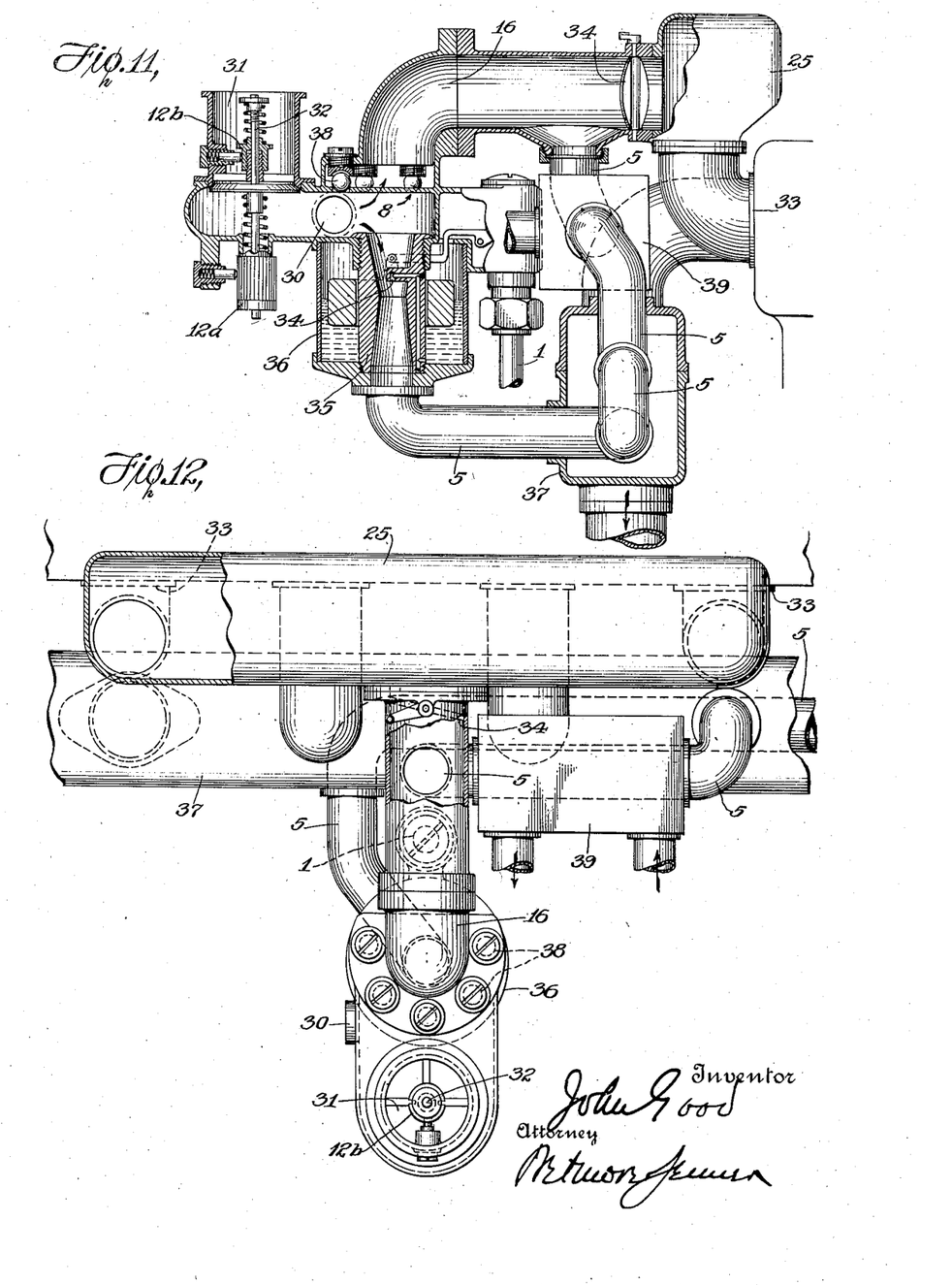
Figs. 11 and 12 illustrate a further modification of the invention in vertical section and top plan, respectively.

In Figs. 11 and 12 the air enters the chamber 8 either through the fixed air entrance 30 in the side wall of said chamber or through the opening 31 which is controlled by the air entrance check valve 32, the latter being a spring loaded valve adjustable by manipulation of the nut 12$^a$ or 12$^b$. The air in the chamber 8 passes to the intake ports through an air passage 16 and also through the vaporizer passage 5, the point of confluence of these two passages being just in advance or outside of, the engine throttle 34ª, as in certain of the forms already described. Such air as flows through the vaporizer tube 5 passes through a Venturi tube 35 wherein is located the discharge nozzle 34 from the fuel receptacle 36, becoming mixed with the liquid fuel at this point. The vaporizer tube leads through the exhaust header 37 whereby the liquid fuel is converted into vapor and mixed with the air. For this purpose the said vaporizer tube may be constructed according to the principles already described. The location of the nozzle orifice in the Venturi tube produces an extremely good spraying effect and correspondingly assists vaporization. The air which passes through the pipe or passage 16 enters the latter through a series of holes in the upper wall of the chamber 8, which holes are normally closed by a number of small balls 38, corresponding in function to the by-pass check valve or flow-resisting organ 14 described in connection with the other forms. In accordance with common practice in carburetors employing such ball valves, the balls are provided with threaded adjustable seats above the balls as shown in the drawings. It will be understood that the pressure depression existing at the discharge orifice in the Venturi tube is a function of the velocity of flow through the said tube and of course also a function of the depression controlled by the air check 32 at the entrance to the chamber 8. All these factors are properly correlated to establish some predetermined or constant ratio between the fuel and air components of the charge mixture which is formed in the intake passage of the engine and flows to the intake ports 33, the fixed air opening 30 serving to supply the apparatus with air at the idling condition and until the check valve 32 opens. In this form it is to be noted further, the junction of the vaporizer tube 5 with the passage 16, is enlarged on the lower side whereby any possible condensation and deposit of liquid is permitted to drain back into the vaporizer tube rather than into the ball valve of the air passage 16.

It will be observed that in all the forms of the invention above described the flow of air drawn into the common entrance space of the carburetor is controlled by a single throttle and is divided between separate passages, one for conducting fuel in liquid form and being heated to vaporize such fuel and the other being unheated, and that the fuel delivery is produced by the suction effect of the engine and that the proportioning thereof is under the primary control of the total air flow, that is to say, the flow through the common entrance or the joint flow in both passages. The single throttle is located in a position where it intercepts and thus directly controls the total air flow, either in advance of the branching thereof into the separate passages, or after the point of confluence of such passages so that the air flow through the heated vaporizer tube is always kept at a vigorous rate. In Figs. 1 to 10 the proportioning of the suction fuel delivery is controlled exclusively by and in accordance with the variation of the air flow at the common entrance space for the two passages, that is to say, the discharge from the fuel orifice varies with the variation of pressure established in the said space by the action of the engine and the valve spring 11. Inasmuch as the temperature of the air in the common entrance space is unaffected by heat variations of the engine, its weight per unit volume is substantially constant, and regulation of the fuel delivery so that it varies in accordance with variation of the flow, pressure or velocity of such air, therefore renders the fuel in the mixture strictly proportional to the weight of air received by the engine; and the proportions of the engine charge mixture are therefore not affected by any degree of heating to which the air may be subsequently subjected after it has passed the entrance space and before it reaches the engine, as by passing a portion of it through the heated vaporizer tube. The practical result of this method of carburation, which may be said to consist in causing the air to measure the fuel before the air has been heated, is that the variation of the exhaust temperature at the vaporizer tube cannot upset the ultimate proportions of the mixture entering the engine, while the air flow through said tube is maintained at a vigorous rate and in sufficient volume to produce effective vaporization for all degrees of opening of the single throttle. The exhaust gas temperature of an engine, particularly an automotive engine, is subject to wide variation, as is also the rate of flow in its intake passage, and consequently, the method described is correspondingly important to the successful use of exhaust-heated carbureting systems of the type described. When the fuel is thus proportioned and only a portion of the air is subsequently heated en route to the engine, viz, an amount which is appropriate for taking up the fuel vapor, the resulting mixture entering the engine is relatively cool, as above stated, and produces excellent volumetric efficiency. The foregoing characteristics of the apparatus illustrated identify the essential principle of this invention which is intended to be covered broadly in the appended claims without limitation to the structural arrangement or minor or other functions of the individual parts.

In Figs. 11 and 12 the delivery of the fuel is by the engine suction and is controlled in accordance with the joint or total flow through all the air passages, as above described, but it is not controlled entirely by variation of the air flow at the common entrance, because the location of the fuel orifice within the Venturi tube has an independent effect on the delivery which is influenced to some extent by temperature variation in the heated part of the vaporizer tube. If the fuel orifice were raised still further away from the throat of the venturi or if the venturi were eliminated, then this carburetor would fully conform to the preceding forms, though the benefits of the venturi action above mentioned would be absent. As a consequence, the disturbing effect of the location of the fuel jet in the Venturi tube, however, is relatively slight and can be approximately compensated by careful coordination of the size of the valves and the venturi passage itself to the conditions in hand, so as to produce a fuel delivery proportional to the total air flow, but the range of the carburetor of Figs. 11 and 12 is somewhat narrower than the preceding forms and to a certain extent its field of usefulness is restricted to those cases where a slight heat disturbance of the mixture proportions is not objectionable and where vigorous fuel discharge or spraying is desired.

It will be understood that the presence of the modulating pin 3 in the suction operated fuel supply means of Figs. 1 to 10 is optional and merely for the purpose of extremely accurate compensation for the known characteristics of liquid flow through fine holes, and that similar or sufficient compensation may be obtained without such a pin, by means well known in the art. This invention employs certain broad principles of carburation also disclosed in my co-pending application, now Patent 1,405,777, to which reference is made as to any matter not herein claimed.

In the various forms above discussed the exhaust header is intended to be connected with an independent source of heat when starting the engine, although it is equally suitable to heat the vaporizer at some point outside of the header, as for example as indicated in Figs. 11 and 12, where the part 39 between the exhaust header 37 and the pipe 16 is an enclosure adapted to conduct flame from an independent source around that part of the vaporizer tube which intervenes between the exhaust and intake headers.

In Figs. 4 to 12, as in the figures first described, it will be understood that the several parts are shown in separated relation for simplicity of illustration and that in practice they are compactly related, so that the vaporized fuel from the vaporizer tube has a minimum distance to travel to its point of junction with the air in the passage 16, and also that the heated parts shown unprotected in the drawings may be covered with heat-insulating material to guard against loss of heat as may be desirable or necessary, and as indicated in Fig. 7.

Claims:

1. A carbureting system for combustion engines, comprising means providing an air entrance space, exhaust gas-heated and unheated passages leading the air therefrom and together conducting the total air supply to the engine, a single engine throttle intercepting and controlling said total air supply, a constant level fuel receptacle having a discharge orifice operated by the engine suction thereon and delivering the fuel in substantially direct proportion to variation of the air flow occurring in said entrance space, and means associated with the unheated passage for promoting flow of the air through the heated passage, said heated passage being arranged for receiving and vaporizing liquid fuel in the presence of such air flow.

2. A carbureting system for combustion engines, comprising means providing an entrance space for air, exhaust-heated and unheated passages leading the air therefrom and together conducting the total air supply for the engine, a single engine throttle intercepting and controlling said total air supply, a constant level fuel receptacle having a discharge outlet delivering fuel by, and in substantially direct proportion to the degree of, the suction established by the engine in said entrance space, and means in the unheated passage for promoting flow of the air through the heated passage, said heated passage being arranged for receiving and vaporizing liquid fuel in the presence of such air flow.

3. A carbureting system for combustion engines, comprising means providing an air entrance space, an exhaust-heated and liquid-fuel-receiving passage leading therefrom and an unheated passage also leading therefrom, said passages together conducting the total air component of the engine charge mixture, a single throttle intercepting and controlling the flow of such total air, a constant level fuel receptacle having a suction-operated outlet subject to the suction variation in said entrance space and uninfluenced by temperature variation in said heated passage, and means in said unheated passage for promoting flow of air through said heated passage.

4. Carbureting apparatus for combustion engines comprising means providing an air entrance space, heated and unheated air passages leading therefrom and together conducting the total air supply for the engine, a single engine throttle intercepting, and controlling the rate of, said total supply, a constant level fuel receptacle having an outlet delivering liquid fuel directly into the heated passage by the effect of the engine suction, means for applying engine exhaust heat to said heated passage for vaporizing the liquid delivered thereinto, and means in the unheated passage to promote flow through said heated passage.

5. A carburetor comprising a body having an air inlet, an air-actuated valve member in said air inlet, two communicating air passages leading from said valve, a check valve for one of said passages, a fuel inlet in the other of said passages delivering fuel thereto under the suction of the engine, a valve controlling said fuel inlet, means connecting said air and fuel valves so that the movement of the air valve controls the fuel valve, means for heating the passage receiving the fuel beyond the point of fuel admission, the said air passages joining beyond the heater to form a single outlet passage, and a throttle in said single passage.

6. A carburetor comprising a passage for air only and a second passage for both fuel and air, the two passages joining in advance of the engine intake port, a fuel orifice opening into said second passage and delivering fuel thereto under the engine suction, means for heating said second passage beyond the point of fuel admission, means subject to the total air flow through both said passages for controlling the said fuel delivery, and a throttle between the junction of the said two passages and the engine.

7. A carburetor comprising an air passage and a second passage for both fuel and air, the two passages joining in advance of the engine ports, a fuel orifice opening into said second passage and delivering fuel thereto under the engine suction, means for heating said second passage, means subject to the total air flow through both said passages for controlling the said fuel delivery, and a throttle between the junction of the said two passages and the engine, the said liquid-receiving passage supplying all the air and the fuel when the engine is idling.

8. A carburetor for combustion engines comprising a suction intake having air admission means adapted to control liquid fuel delivery and two confluent passages receiving air passing said admission means and joining in advance of the engine intake port to form a single passage, a fuel orifice delivering liquid fuel into one of said two passages under the engine suction and in amounts controlled by said air admission means, means for heating said passage receiving the liquid fuel, a flow-resisting member in the other parallel passage, and a throttle in said single passage, the said flow-resisting member causing the liquid-receiving passage to supply all the air as well as the fuel when the engine is idling.

9. A carbureting system for combustion engines comprising means providing an air entrance space, receiving unheated air, an exhaust-heated air passage leading therefrom and adapted for receiving liquid fuel, an unheated air passage leading from said space, said passages together conducting the total air supply for the engine, a single engine throttle intercepting said total air supply, a constant level fuel receptacle and a discharge outlet therefor subject to the engine suction in said entrance space and located in a position where it is uninfluenced by variation of the temperature in said exhaust-heated passage.

10. Carbureting apparatus comprising heated and unheated air passages in parallel relation, together conducting the total air supply for the engine to a point of junction, a single throttle intercepting and controlling the united flow between said point and the engine, a liquid fuel receptacle having an outlet orifice delivering fuel to the heated passage by the effect of the engine suction therein and organized to deliver such fuel in proportion to the total air flow through all said passages, means for applying engine exhaust heat to said heated passage, and means in the unheated passage operating to promote flow of the air through the heated, fuel-receiving passage.

11. A carburetor comprising means providing an air entrance space, heated and unheated passages leading therefrom and together conducting the total air supply for the engine, a single throttle intercepting and controlling said total air supply, a constant level fuel receptacle having an outlet orifice situated in a position sufficiently near said entrance space to be uninfluenced in its delivery rate by temperature variations in said heated passage and arranged for delivering liquid fuel into said passage by the effect of the engine suction established in said entrance space and means for applying engine exhaust gas heat to said heated passage for vaporizing the liquid delivered thereinto.

12. A carburetor comprising means providing an entrance space for air, heated and unheated passages disposed in parallel relation and dividing between them the total air supply for the engine, an engine throttle intercepting and controlling the air flow between the junction of said passages and the engine, a constant level liquid fuel receptacle having an outlet orifice situated adjacent said air entrance space and substantially out of the influence of variations occurring in said heated passage, said orifice delivering liquid fuel into the heated passage by the effect of the engine suction established at said entrance space, means for applying engine heat to said heated passage, and means in said unheated passage promoting flow of the air from said entrance means through the heated passage.

13. A carburetor comprising means providing an air entrance space, heated and unheated air passages disposed in parallel relation and dividing between them the total air supply for the engine, an engine throttle intercepting and controlling the air flow between the junction of said passages and the engine, a constant level liquid fuel receptacle having an outlet orifice situated adjacent said air entrance space and substantially out of the influence of variations occurring in said heated passage, said orifice delivering liquid fuel into the heated passage by the effect of the engine suction established in said entrance space, means for applying heat to said heated passage, and flow-opposing means associated with said unheated passage for promoting flow of the air from said entrance space through the heated passage, said heated passage having a diameter adapting it to conduct all the air requisite for average load operation of the engine.

14. The combination with a multi-cylinder internal combustion engine having an exhaust manifold, of a carbureting system comprising means providing an entrance space for air, air conducting passages leading therefrom and together conducting the total air supply for the engine, one of said passages being located within the exhaust manifold for heating thereby, a single throttle intercepting the total air flow of both passages, and a suction operated fuel orifice delivering fuel under the control of the flow of air in said entrance space, said fuel being delivered into that one of the said air passages which is in the exhaust manifold.

15. The combination with an internal combustion engine having two groups of cylinders, each group having an exhaust manifold, of a carbureting system comprising means providing an air entrance space, an air conducting passage or passages leading therefrom to the engine, two other air conducting passages, one for each of said cylinder groups, also leading from said air entrance space to the engine, said last mentioned passages being located one in each of said exhaust manifolds for heating thereby, a single throttle intercepting and controlling the total air flow to each of said groups of cylinders, and suction operated fuel orifice means delivering fuel into those of said air passages that are located in the exhaust manifolds, said orifices delivering the fuel under the control of and substantially proportional to the flow of air in said air entrance space.

16. The combination with an internal combustion engine having its cylinders arranged in two groups, each of which has its own exhaust manifold, of a carbureting system comprising means providing a joint air entrance space for both of said groups of cylinders, an air passage or passages leading from said air entrance space to both said groups of cylinders, a second air passage leading from said air entrance space to each of said groups, said second air passages being located one in each of said manifolds for heating thereby, an individual fuel orifice means for delivering fuel to each of said heated air passages, and throttle means intercepting the total air flow, for controlling the supply of fuel and air to the engine.

In testimony whereof, I have signed this specification.

JOHN GOOD.